United States Patent [19]
Pittelko

[11] Patent Number: 5,243,900
[45] Date of Patent: Sep. 14, 1993

[54] APPARATUS FOR TRANSFERRING BULK CHEESE

[75] Inventor: Allen J. Pittelko, Oakfield, Wis.

[73] Assignee: Damrow Company, Inc., Fond du Lac, Wis.

[21] Appl. No.: 872,189

[22] Filed: Apr. 22, 1992

[51] Int. Cl.⁵ .................. A01J 11/06; A01J 25/00; A01J 25/11

[52] U.S. Cl. .................... 99/461; 53/518; 53/122; 99/452; 99/460; 414/332

[58] Field of Search .......... 99/452, 453, 456, 460, 99/461, 353, 355; 53/576, 518, 512, 122, 86, 527, 438; 414/332, 417, 773; 425/308, 444, 442, 85, 441; 426/582, 512

[56] References Cited

U.S. PATENT DOCUMENTS

| | | | |
|---|---|---|---|
| 3,696,950 | 10/1972 | Peters | 414/332 |
| 3,871,801 | 3/1975 | Buchmann | 425/442 |
| 4,061,794 | 12/1977 | Charles | 426/486 |
| 4,137,836 | 2/1979 | Megard | 99/454 |
| 4,237,781 | 12/1980 | Charles | 99/459 |
| 4,420,296 | 12/1983 | Anderson | 425/444 |
| 4,539,902 | 9/1985 | Brockwell et al. | 425/85 |
| 4,976,980 | 12/1990 | Yntema | 426/512 |
| 5,001,972 | 3/1991 | Greenfield et al. | 99/454 |
| 5,146,845 | 9/1992 | Pittelko | 99/452 |
| 5,175,014 | 12/1992 | Brockwell et al. | 53/512 |

FOREIGN PATENT DOCUMENTS 1291088 2/1987 U.S.S.R. ................... 99/452

Primary Examiner—Timothy F. Simone
Attorney, Agent, or Firm—Andrus, Sceales, Starke & Sawall

[57] ABSTRACT

A cheese transfer system is adapted for receiving a column of cheese as it is discharged from a continuous cheese making system. The cheese transfer system has an expandable chamber into which the cheese is introduced. The chamber is then compressed to clamp the cheese for maintaining the cheese in the configuration developed by the tower. The chamber is then introduced into a shipping and storage container, after which the chamber is expanded and withdrawn from the container to release the cheese. The cheese is then allowed to expand fully into the container by settling.

17 Claims, 4 Drawing Sheets

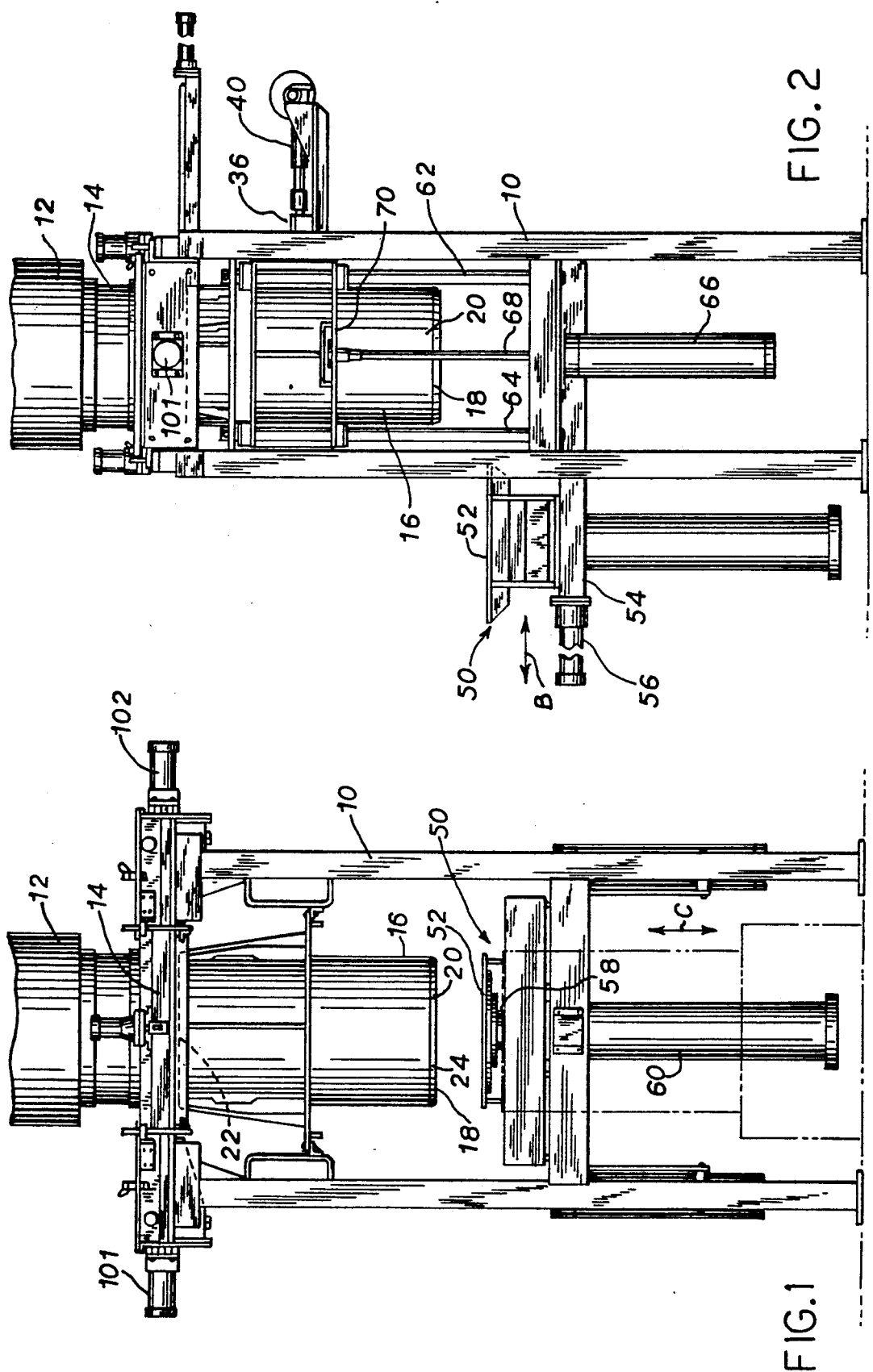

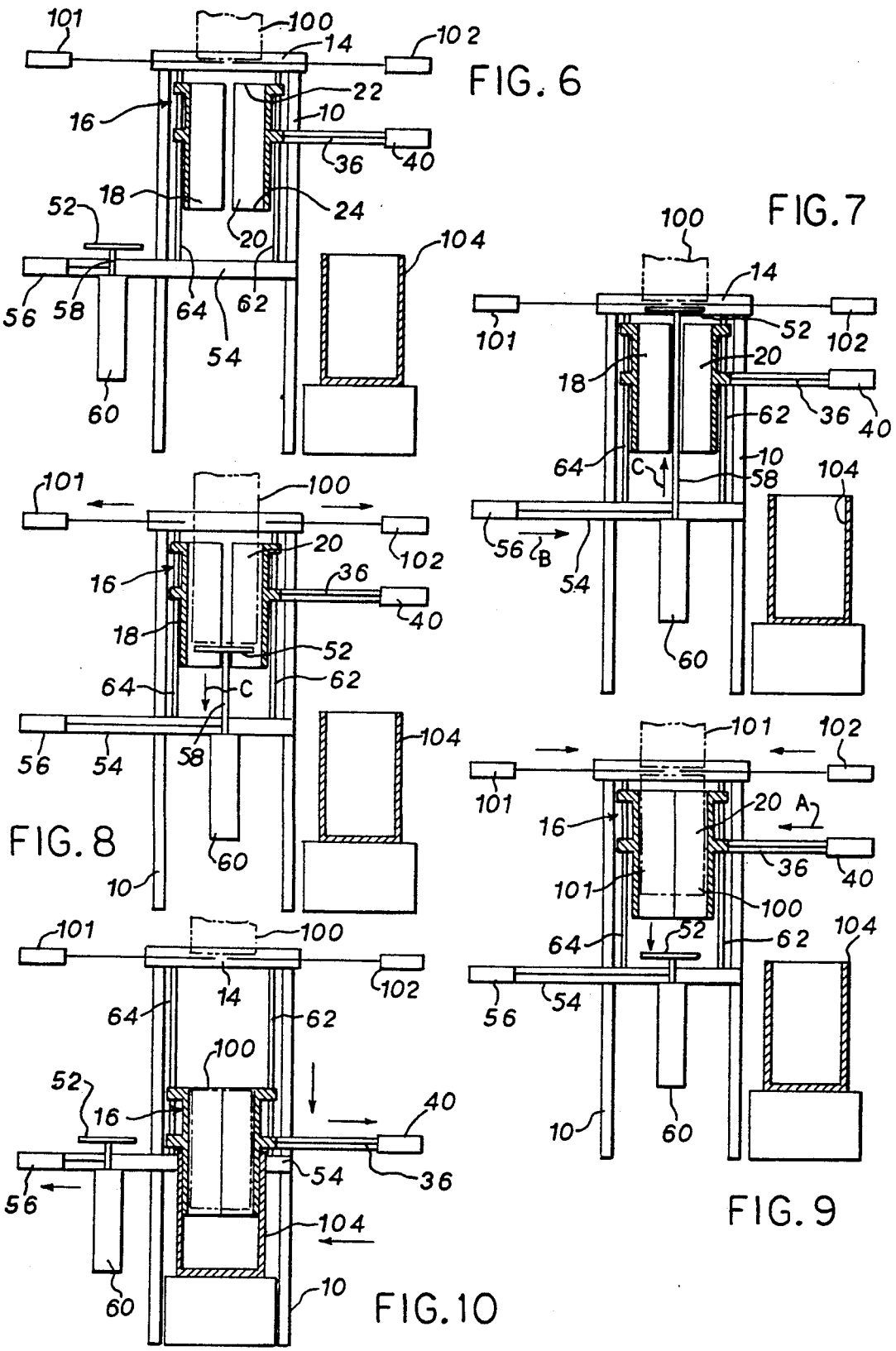

APPARATUS FOR TRANSFERRING BULK CHEESE

BACKGROUND OF THE INVENTION

1. Field of the Invention

This invention is generally related to continuous processes for making bulk cheese and is specifically directed to the transfer system for transferring cheese discharged from the processing system into a shipping container.

2. Cross Reference to Related Application

This application is related to the co-pending applications entitled: "Continuous Cheese Former for Bulk Cheese", by Allen J. Pittelko, filed on Aug. 7, 1991, Ser. No. 07/741,319 and "Process for Making Bulk Cheese", by Allen J. Pittelko, filed on Aug. 7, 1991, Ser. No. 07/741,320, now U.S. Pat. No. 5,146,845.

3. Description of the Prior Art

Bulk cheese has typically been made in 600–650 pound blocks or 500 pound barrels. In the prior art, the bulk cheese blocks and barrels were made by feeding a curd mixture into a suitably sized container such as a large barrel or drum, drawing air away from the mixture in the container, probing the container with a vacuum tube, compressing the cheese to squeeze out the moisture, tipping to drain whey out of the open top of the container, and drawing a vacuum on the perimeter of the cheese to draw out the moisture and air to establish the right consistency. Basically, the entire process was formed in the container in which the cheese was both stored and shipped.

Over the years, cheese manufacturing equipment and processes have developed to the point where smaller quantities of cheese such as, by way of example, 40 pound blocks or the like can be made in a continuous process. In this process, the cheese is generally manufactured in a vertical tower wherein the curd is drawn into the tower and the vacuum draw is used to separate the water, air and whey from the curd, with the curd collecting at the bottom of the tower and compressing to form cheese. The bottom of the tower is then opened to release the cheese which is cut into predetermined size blocks. The continuous process for manufacturing the 40 pound cheese blocks has substantial advantages over the cheese making methods wherein each finished unit of cheese is made in the cheese storage and shipping container. Specifically, using the continuous process provides a higher quality cheese with a better controlled consistency, reduces the amount of space required to make the cheese, reduces the labor involved in the various steps and facilitates clean-up while enhancing sanitation of the operation. The specific advantage of the continuous process is that the cheese is ready for cooling and shipment once it is removed from the tower. An example of a cheese block former for continuously making 40 pound blocks of cheese is the CBF Cheese Block Former manufactured by Damrow Company, Fond du Lac, Wis. The CBF Cheese Block Former is adapted to process 1,500 pounds per hour, producing the 40 pound blocks. When functioning at full capacity, the CBF former can produce approximately forty 40 pound blocks per hour.

While the continuous process for making 40 pound blocks has greatly enhanced the cheese making methods of the prior art, it has been heretofore impossible to make large batches of cheese such as the 600–650 pound blocks and 500 pound barrels without making single batch units of cheese in the containers in which the cheese is both stored and shipped. Typically, a 40 pound block of cheese is rectangular in shape and is 7 inches high by 14 inches deep by 11 inches wide. In contrast, a 640 pound block of cheese is 28 inches high by 28 inches deep by 22 inches wide. A 500 pound barrel is approximately 34 inches high with a diameter of 22 inches.

A major problem associated with making large batch cheese in a continuous process is the proper removal and shaping of the cheese as it is discharged from the process. While 40 pound blocks are a sufficiently small mass to basically retain their shape as they are discharged from the continuous cheese making process, the large bulk of cheese associated with the large blocks or barrels have a sufficient enough mass to collapse under their own weight if not properly contained as they are discharged form the manufacturing system. Inability to properly discharge the cheese can become as significant an issue in making continuous cheese in bulk quantities as the processing of the cheese itself.

SUMMARY OF THE INVENTION

The subject invention is adapted for use with an apparatus for making large batches of cheese in a continuous process, such as, by way of example, 600–650 pound blocks of cheese or 500 pound barrels of cheese. The invention is a transfer system adapted to be used with a tower system for making the cheese, wherein the cheese is discharged from the bottom of the tower in a continuous processing system. As the cheese is released from the tower, it is introduced into storage and shipping containers. In the preferred embodiment of the invention, the transfer system comprises a chamber which is adapted to surround the cheese as it is released from the tower. The chamber maintains the shape of the cheese and introduces it into a shipping container. The chamber has been found to be useful for cheese made in both the block and barrel form.

In the preferred embodiment, the chamber comprises a walled unit having an open top and bottom and expandable side walls. The open top is placed in communication with the cheese making system and receives the cheese as it is discharged from the system. As the cheese is discharged and enters the walled chamber, the walls are in their expanded position. A support platform supports and guides the cheese into the chambers. Once the chamber is filled with cheese, the walls are contracted to compress around the cheese and clamp it in position. The cheese contained in the chamber is then introduced into a shipping container.

It is desirable that the peripheral side walls of the cheese chamber be shaped to conform to the perimeter of the shipping container. The entire chamber may then be inserted into the container, and the walls expanded for releasing the cheese. The chamber is then withdrawn from the container and the cheese is allowed to expand to the full perimeter of the container through settling.

In the preferred embodiment, a support member is placed in the chamber and in communication with the discharge port of the cheese tower. The support member supports the cheese as it is discharged, holding the cheese in position while the clamping action generated by contracting the side walls of the chamber is activated. Once is cheese is fully clamped within the chamber, the support member is removed and the cheese is suspended in the chamber and held in place by the clamping action. At this point, the wall chamber may be inserted into the container.

In the preferred embodiment of the invention, the chamber comprises a pair of side walls each defining approximately one-half of the perimeter of the chamber, the side walls having outer ends adapted to be placed in overlapping relationship with one another to assure that the cheese stays completely within the container as the clamping action is initiated. The cheese enters the chamber traveling longitudinally along the axis of the chamber and a ram is utilized to move the walls relative to one another in a transverse action for generating the clamp. The chamber may be used to maintain the shape of the cheese in either the rectangular block form or the barrel form, as desired.

It is, therefore, an object and feature of the subject invention to provide a continuous method and apparatus for manufacturing large blocks and barrels of cheese using a continuous cheese processing method.

It is a further object and feature of the subject invention to provide a continuous method and apparatus for manufacturing 600–650 pound blocks of cheese and/or 500 pound barrels of cheese.

It is yet another object and feature of the subject invention to provide a transfer system for transferring the discharged cheese from a continuous cheese making process into a shipping container.

It is an additional object and feature of the subject invention to provide a transfer system adapted for maintaining the cheese in a predetermined shape as it is transferred from a discharge port in a cheese making system into a shipping and storage container.

Other objects and features of the invention will be readily apparent from the accompanying drawings and detailed description.

BRIEF DESCRIPTION OF THE DRAWINGS

FIG. 1 is a front plan view of the transfer system in accordance with the subject invention.

FIG. 2 is a side plan view of the transfer system shown in FIG. 1.

FIGS. 6–10 are diagrammatic illustrations of the method for transferring cheese from the cheese tower into a shipping and storage container, in accordance with the subject invention.

DETAILED DESCRIPTION OF THE PREFERRED EMBODIMENT

Figure 3:
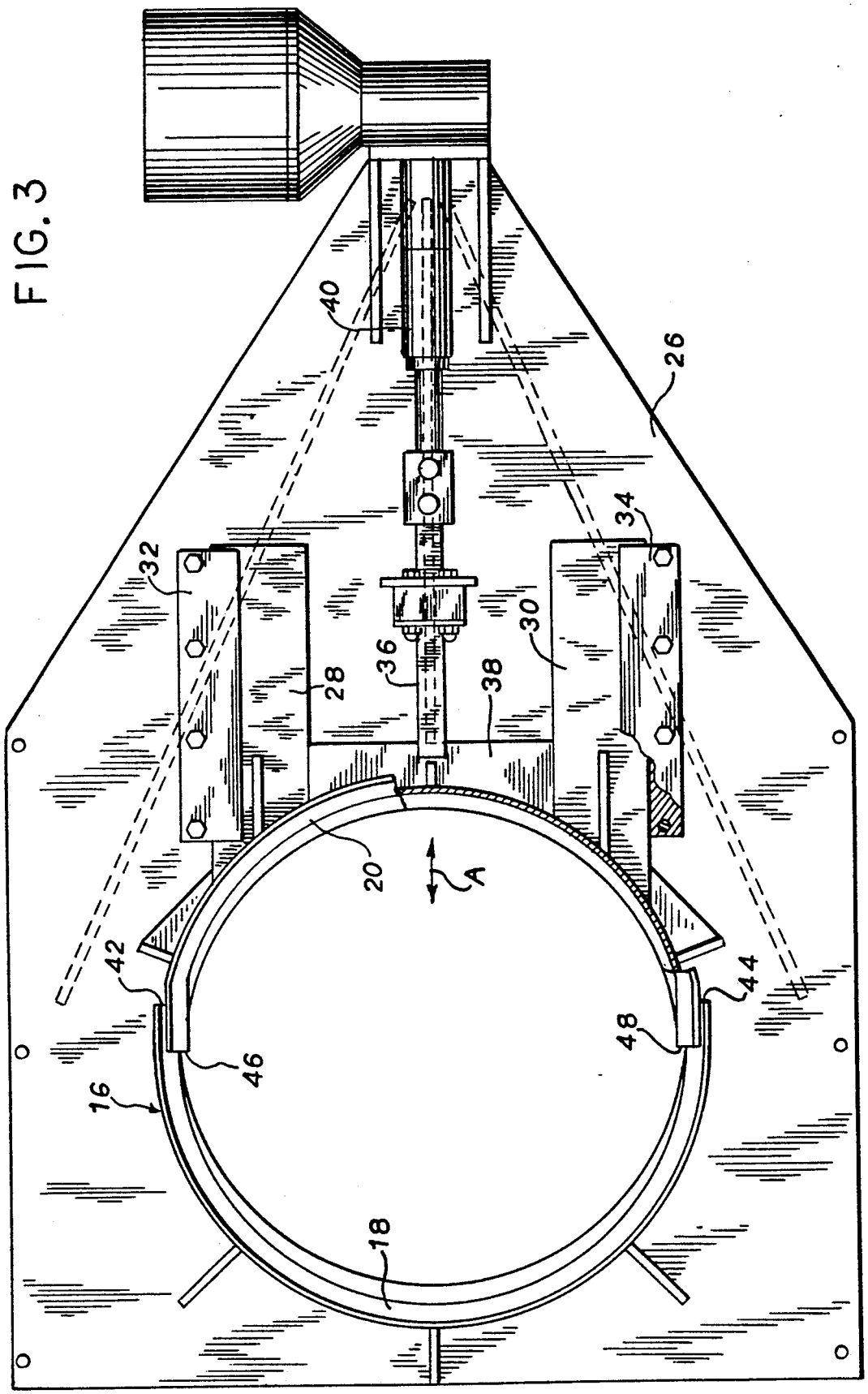
FIG. 3 is a top plan view of the cheese transfer system shown in FIG. 1.

The cheese transfer system of the subject invention is shown in the drawings and comprises an outer frame 10 in which the transfer system is housed. The frame 10 is adapted for supporting a cheese tower 12 having a discharge port at 14. The cheese tower and method of manufacturing bulk cheese in a continuous process is fully described in my co-pending applications, Ser. Nos. 07/741,319 and 07/741,320. These applications are incorporated by reference herein. The cheese is produced in a continuous process, as described in the aforementioned applications, and is intermittently discharged from the discharge port 14. Cheese lowers from the discharge port 14 into the transfers system of the subject invention, as will be described.

In the preferred embodiment of the invention, a chamber 16 is defined by a pair of peripheral, interengaging, overlapping side walls 18 and 20 and includes an open upper end 22 and an open lower end 24. The chamber 16 is disposed in axial relationship with the cheese tower discharge port 14. With specific reference to FIG. 3, it will be noted that the chamber 16 includes side walls 18 and 20 which are slightly tapered, generally at an angle of approximately 3°, whereby the opening of the lower end 24 is slightly smaller than the opening of the upper end 22. This increases the clamping force at the bottom, assuring that the cheese stays in the chamber. As also shown in FIG. 3, the side wall 18 is mounted in a support structure 26 and is stationary relative to its axial alignment with the cheese tower. The side wall 20 is carried on a pair of slides 28 and 30 which are mounted for transverse sliding movement in the rails 32 and 34, respectively, which are mounted on the support brace 26. A ram 36 is secured to the side wall 20 at the coupling plate 38 and is driven by the cylinder 40 to advance and retract the side wall 20 relative to the axis of the chamber and relative to the side wall 18, in the directions indicated ta the arrow A.

Figures 4, 5:
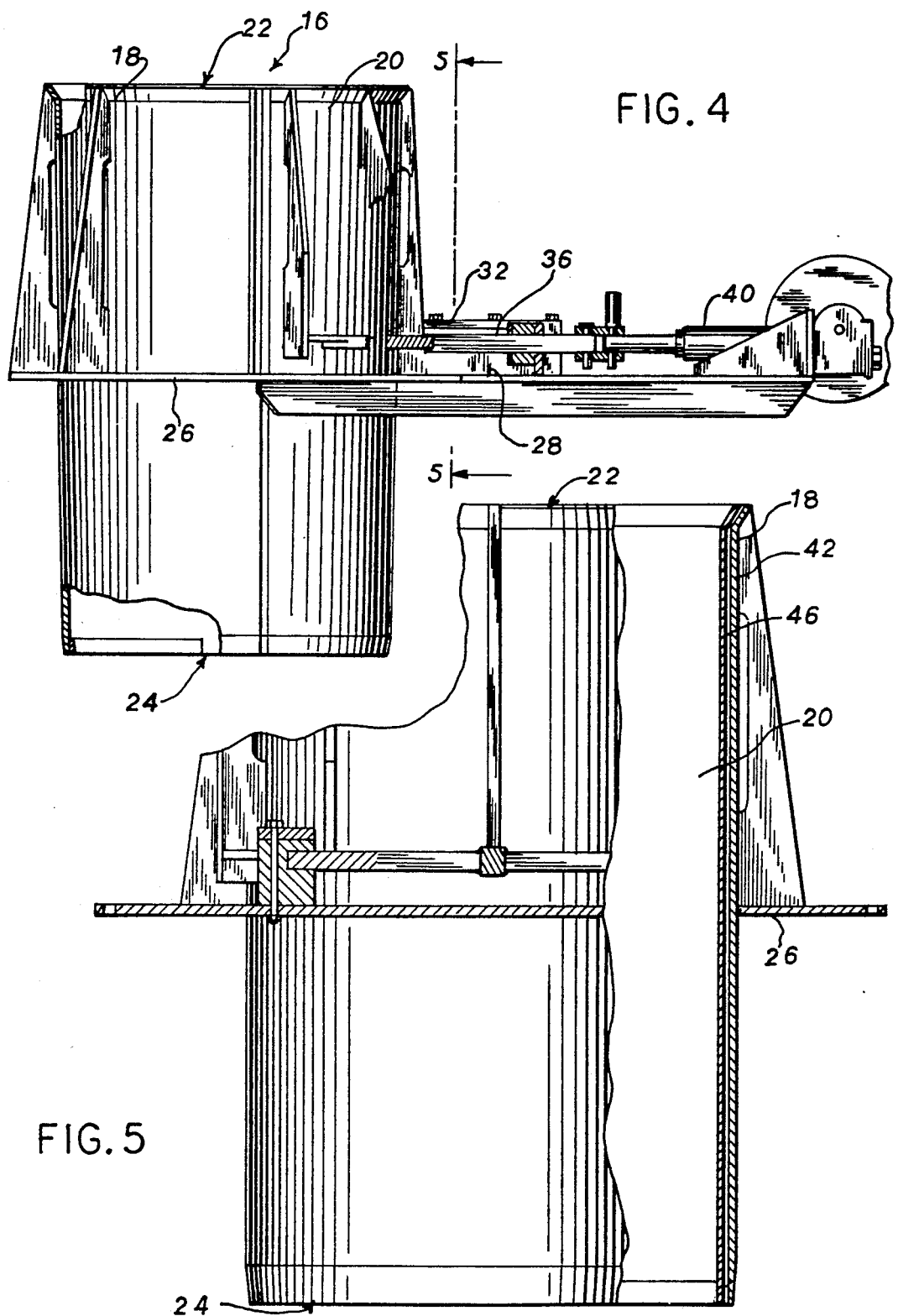
FIG. 4 is an enlarged, partial view looking in the same direction as FIG. 2, showing the details of the expandable chamber.
FIG. 5 is a view, partially in section, looking generally in the direction of the line 5—5 of FIG. 4.

In the preferred embodiment of the invention, the outer ends 42 and 44 of the side wall 18 are adapted to be positioned in overlapping relationship with the outer ends 46 and 48 of the side wall 20 which assures that the chamber has a closed perimeter whether the sidewall 20 is in the retracted or expanded position. (See FIGS. 3 and 5).

With reference to FIGS. 1 and 2, it will be noted that a cheese platform assembly 50 is mounted on the frame beneath the chamber 16. In FIGS. 1 and 2, the platform 50 is shown in the fully retracted position where it is located transversely outwardly from the axis of the tower 12. The platform assembly 50 includes a support plate 52 which is flat and adapted to be received in the cheese chamber 16 through the lower open end 24. As is shown in FIGS. 1 and 2, the plate 52 is mounted on a slide rail 54 and is driven by a cylinder and ram assembly 56 for moving the platform transversely relative to the tower axis, in the directions indicated by the arrow B. The platform 52 is also independently supported on a ram 58 (FIG. 1) which is driven by the cylinder actuator 60 for moving the platform plate 52 axially relative to the tower 12, as indicated by the arrow C.

In the preferred embodiment of the invention, the chamber 16 is also adapted to be moved axially relative to the tower 12. As is shown in FIG. 2, the chamber 16 is mounted on a plurality of slides 62 and 64 and the like for motion relative to the tower 12 and frame 10. The actuator cylinder 66 includes a ram 68 which is attached directly to the chamber assembly 16 via the support brackets 70. The actuator 66 is adapted for driving the ram for advancing and retracting the chamber 16 along the sides 62 and 64 and axially relative to the tower 12.

In the preferred embodiment of the invention, in cheese transfer system operates as diagrammatically illustrated in FIG. 6–10. Specifically, the system is initially in the at ready position shown in FIG. 6. As there shown, ram 36 is retracted to expand the chamber 16 by separating the sidewalls 18 and 20 to their outermost, expanded position. The support plate 52 is completely withdrawn from the chamber 16 and is transversely removed from the axis of the system, as shown. The tower (not shown) supports a continuous column of cheese, shown in phantom at 100, which is above the closed discharge port 14.

In order to initiate operation, cylinder 56 is actuated to advance the support plate 52 into axial alignment with the tower system, along slides 54, as indicated by arrow B in FIG. 7. Cylinder 60 is then actuated to advance the ram 58 in the direction indicated by arrow C to advance the support plate 52 to a position adjacent the port 14 of the tower. The tower discharge port actuators, as indicated at 101 and 102, are then activated to permit the cheese column 100 to fall through the port. As shown in FIG. 8, the cylinder 60 is then actuated to withdraw the plate 52 downwardly while supporting the cheese through the chamber 16, as indicated by arrow C in FIG. 8.

When the cheese fully fills the chamber 16, the discharge port actuators 101 and 102 are closed, slicing the column of cheese and closing the tower to preclude the discharge of additional cheese therefrom. The chamber actuator cylinder 40 is then actuated to drive ram 36 in the direction of the arrow A as shown in FIG. 9, for compressing the side walls 18 and 20 of the chamber 16 relative to one another for clamping the cheese mass 100 in the chamber. The plate 52 continues to be vertically withdrawn to the position shown in FIG. 9. The plate is then transversely withdrawn to the positions shown in FIG. 6.

The shipping and storage container 104 may then be placed under the chamber 16 and in axial alignment with the cheese system, as shown in FIG. 10. Once the container is in place, the compressed chamber 16 is inserted partially into the container 104, as shown in FIG. 10. At this point, the cylinder 40 is actuated for partially retracting the ram 36 for expanding the chamber 16. The chamber 16 is then advanced upwardly on slides 62 and 64 and withdrawn from the container. The cheese mass 100 stays in the container and, as soon as it is unclamped and released by the chamber 16, is allowed to expand to the outer perimeter of the container. The chamber 16 is advanced to its uppermost position as shown in FIG. 6 and the sidewalls are fully expanded, also shown in FIG. 6. At this point, the filled container 104 may be withdrawn from the system and the process may be repeated.

It has been found that the transfer system of the subject invention is equally well suited for producing either rectangular blocks of cheese with a mass of 600–650 pounds or a conventional 500 pound cylindrical barrel of cheese. While certain features and embodiments of the invention have been described in detail herein, it will be readily understood that the invention encompasses all enhancements and modifications within the scope and spirit of the following claims.

What is claimed is:

1. A cheese transfer device for receiving and transferring cheese in predetermined volume and shape as it is discharged from a continuous cheese making system in order that the cheese may be inserted into a shipping container of predetermined shape, the device comprising:
   a. a walled chamber having an open top, an open bottom and expandable side walls, the open top adapted to be placed in communication with the cheese making system for receiving the cheese as it is discharged therefrom; and
   b. an actuator adapted for moving the side walls between a first, expanded position and a second, contracted position whereby both the internal and the external perimeter of the chamber is reduced, the side walls being in the expanded position as the cheese is discharged into the chamber and the side walls movable into the contracted position when the predetermined volume of cheese has been discharged into the chamber for clamping the cheese therein and compressing the cheese to the predetermined shape; and
   c. a driver adapted for positioning the chamber above and in communication with the shipping container, whereby the cheese in the chamber may be released from the chamber and introduced into the container by expanding the sidewalls and permitting the cheese to drop through the open bottom.

2. The cheese transfer device of claim 1, wherein the outer perimeter of the chamber is adapted to fit inside the container when the side walls are in the contacted position.

3. The cheese transfer device of claim 2, wherein the perimeter of the chamber is of a configuration substantially identical to the configuration of the container.

4. The cheese transfer device of claim 1, further comprising:
   a. a support member positioned beneath the open bottom of the chamber; and
   b. a control mechanism adapted for moving the support member into and out of the chamber, the support member movable into the chamber to support the cheese as it is discharged from the cheese making system and movable out of the chamber when the side walls are contracted to clamp the cheese.

5. The cheese transfer device of claim 4, wherein the container movable from a remote position to the position where the chamber is above and in communication with the chamber when the support member is out of the chamber.

6. The cheese transfer device of claim 4, wherein the control mechanism is adapted for moving the support member both axially and transversely relative to the chamber.

7. The cheese transfer device of claim 3, wherein both the side walls of the chamber and the perimeter of the container are of a generally circular configuration.

8. The cheese transfer device of claim 3, wherein both the side walls of the chamber and the perimeter of the container are of a generally rectangular configuration.

9. The cheese transfer device of claim 1, wherein the chamber includes a pair of side walls, each defining approximately one-half of the perimeter of the chamber, and wherein the side walls are adapted to be moved transversely relative to one another for expanding and contracting the perimeter.

10. The cheese transfer device of claim 9, wherein the actuator further includes a ram associated with one of said side walls and adapted for advancing said side wall toward and retracting said side from the other of said side walls 11. The cheese transfer device of claim 9, wherein each of said side walls includes a pair of opposite longitudinal side edges, and wherein the respective longitudinal side edges are adapted to be placed in overlapping engagement with one another when the side walls are in the contracted position.

12. The cheese transfer device of claim 1, wherein said cheese making device is located above and in axial alignment with said chamber and said container is adapted to be placed below and in axial alignment with said chamber, the cheese transfer device further including an elevator mechanism adapted for supporting and axially moving the chamber between an upper position wherein the open top of the chamber is communication the cheese making system and a lower position wherein the chamber is inserted in the container.

13. The cheese transfer device of claim 1, further including a frame supporting the actuator and the chamber, the frame further adapted for supporting the cheese making system above the chamber.

14. A cheese transfer device for receiving and transferring cheese in predetermined volume and shape as it is discharged from a continuous cheese making system in order that the cheese may be inserted into a shipping container of predetermined shape, the device comprising:
   a. a walled chamber having an open top, and open bottom and expandable side walls defining a chamber perimeter, the open top adapted to be placed in communication with the cheese making system for receiving the cheese as it is discharged therefrom; and
   b. an actuator adapted for moving the side walls between a first, expanded position and a second, contracted position whereby both the internal and the external perimeter of the chamber is reduced, the side walls being in the expanded position as the cheese is discharged into the chamber and the side walls movable into the contracted position when the predetermined volume of cheese has been discharged into the chamber for clamping the cheese therein and compressing the cheese to the predetermined shape; and
   c. a driver adapted for positioning the chamber above and in communication with the shipping container, whereby the cheese in the chamber may be released from the chamber and introduced into the container by expanding the sidewalls and permitting the cheese to drop through the open bottom, wherein the outer perimeter of the chamber is adapted to fit inside the container when the side walls are in the contracted position; and
   d. an elevator mechanism adapted for supporting and axially moving the chamber between an upper position wherein the open top of the chamber is communication the cheese making system and a lower position wherein the chamber is inserted in the container.

15. The cheese transfer device of claim 14, further comprising:
   a. a support member positioned beneath the open bottom of the chamber; and
   b. a control mechanism adapted for moving the support member into and out of the chamber, the support member movable into the chamber to support the cheese as it is discharged from the cheese making system and movable out of the chamber when the side walls are contracted to clamp the cheese.

16. The cheese transfer device of claim 15, wherein the chamber includes a pair of side walls, each defining approximately one-half of the perimeter of the chamber, wherein the side walls are adapted to be moved transversely relative to one another for expanding and contracting the perimeter, and wherein the actuator further includes a ram associated with one of said side walls and adapted for advancing said side wall toward and retracing said side from the other of said side walls.

17. The cheese transfer device of claim 16, wherein each of said side walls includes a pair of opposite longitudinal side edges, and wherein the respective longitudinal side edges are adapted to be placed in overlapping engagement with one another when the side walls are in the contracted position.

* * * * *